United States Patent
Katou

(10) Patent No.: US 7,019,630 B2
(45) Date of Patent: Mar. 28, 2006

(54) TRANSMITTER OF TIRE CONDITION MONITORING APPARATUS AND TIRE CONDITION MONITORING APPARATUS

(75) Inventor: Michiya Katou, Aichi-ken (JP)

(73) Assignee: Pacific Industrial Co., LTD, Ogaki (JP)

( * ) Notice: Subject to any disclaimer, the term of this patent is extended or adjusted under 35 U.S.C. 154(b) by 219 days.

(21) Appl. No.: 10/800,807

(22) Filed: Mar. 15, 2004

(65) Prior Publication Data
US 2004/0239492 A1 Dec. 2, 2004

(30) Foreign Application Priority Data
May 28, 2003 (JP) ............................. 2003-150556

(51) Int. Cl.
*B60C 23/00* (2006.01)
(52) U.S. Cl. .................. 340/448; 116/34 R; 73/146.5; 73/146.8; 340/447
(58) Field of Classification Search ................ 340/442, 340/443, 444, 445, 446, 447, 448; 116/34 R, 116/34 A; 73/146.2, 146.3, 146.4, 146.5, 73/146.8
See application file for complete search history.

(56) References Cited

U.S. PATENT DOCUMENTS

| | | | | |
|---|---|---|---|---|
| 4,742,857 A | * | 5/1988 | Gandhi | 152/418 |
| 5,081,443 A | | 1/1992 | Breit | 340/426 |
| 5,109,213 A | | 4/1992 | Williams | 340/447 |
| 5,557,256 A | * | 9/1996 | Achterholt | 340/442 |
| 5,717,135 A | * | 2/1998 | Fiorletta et al. | 73/146.5 |
| 5,774,048 A | | 6/1998 | Achterholt | 340/447 |

FOREIGN PATENT DOCUMENTS

| | | |
|---|---|---|
| EP | 0 671 289 A | 9/1995 |
| GB | 2 344 232 A | 5/2000 |
| JP | 2000-103209 | 4/2000 |

* cited by examiner

Primary Examiner—Brent A. Swarthout
(74) Attorney, Agent, or Firm—Vidas, Arrett & Steinkraus

(57) ABSTRACT

A transmitter in an apparatus for monitoring a condition of a tire includes a pressure sensor, a transmission circuit, a valve stem, an MR sensor, and a magnetic ring. The valve stem has magnetic pieces. The pressure sensor measures the air pressure in the interior of the tire. The transmission circuit generates a transmission signal containing data that represents the measured air pressure. The magnetic ring magnetizes the magnetic pieces. The position of the magnetic ring relative to the magnetic pieces can be changed. A magnetized state of the magnetic pieces varies according to the position of the magnetic ring relative to the magnetic pieces. The MR sensor detects the magnetized state of the magnetic piece. The transmission signal contains data based on the detected magnetized state in addition to the tire condition data. This is capable of identifying the tire mount position.

14 Claims, 4 Drawing Sheets

TRANSMITTER OF TIRE CONDITION MONITORING APPARATUS AND TIRE CONDITION MONITORING APPARATUS

BACKGROUND OF THE INVENTION

The present invention relates to a transmitter of a tire condition monitoring apparatus that permits a driver in a vehicle passenger compartment to check the conditions of tires, such as the air pressure, and to a tire condition monitoring apparatus. More particularly, the present invention relates to a transmitter of a tire condition monitoring apparatus that can be identified as a data transmission source among a plurality of transmitters of the same type respectively provided in a plurality of tires, and to a tire condition monitoring apparatus using the transmitter.

Wireless tire condition monitoring apparatuses that allow a driver in a vehicle passenger compartment to check the conditions of vehicle tires have been used. One such monitoring apparatus includes transmitters, each of which is attached to one of the tires. Each transmitter detects condition, such as the pressure, of the associated tire, and wirelessly transmits data representing the detected tire conditions. A receiver for receiving the data that has been wirelessly transmitted from the transmitters is provided on the vehicle body.

The transmitters each transmit data representing a condition of the corresponding tire to the single receiver. When receiving data, the receiver must identify which one of the transmitters has sent the data. To enable the identification, a specific identification data (ID code) is given to each of the transmitters. Each transmitter transmits data on the conditions of the tire together with an ID code given to it. The receiver can therefore identify the transmitter as the transmission source on the basis of the ID code (refer to Japanese Laid-Open Patent Publication No. 2000-103209).

To enable the receiver to identify the transmission-source transmitter, it is necessary to register, in advance, in the receiver, the ID codes for the transmitters in the tires mounted on the vehicle. At the time of initial registration, there is also a need to relate the ID codes to the positions at which the tires with the transmitters having the ID codes are mounted. Therefore, initial registration must be performed always when a new tire is mounted on the vehicle or when the mounted positions of the tires on the vehicle are changed. The process of manually performing such initial registration is troublesome and time-consuming.

SUMMARY OF THE INVENTION

The present invention has been achieved in consideration of the above-described problem, and objectives of the present invention are:

(1) to provide a transmitter of a tire condition monitoring apparatus capable of identifying the tire mount position; and (2) to provide a tire condition monitoring apparatus capable of identifying tire mount positions and requiring no initial registration operation.

To achieve the foregoing and other objectives and in accordance with the purpose of the present invention, a transmitter in an apparatus for monitoring a condition of a tire of a vehicle is provided. The transmitter is provided in the tire, and includes a measuring device, a transmission circuit, a valve stem, a magnetizing member, and a magnetized state detecting device. The measuring device measures a condition of the tire. The transmission circuit generates a transmission signal containing data that represents the measured tire condition. The tire is filled with air through the valve stem. The valve stem has a magnetic piece. The magnetizing member magnetizes the magnetic piece. The position of the magnetizing member relative to the magnetic piece can be changed. A magnetized state of the magnetic piece varies according to the position of the magnetizing member relative to the magnetic piece. The magnetized state detecting device detects the magnetized state of the magnetic piece. The transmission signal contains data based on the detected magnetized state in addition to the tire condition data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment will now be described with reference to the drawings. The apparatus 1 is used in a vehicle such as an automobile.

Figure 1:
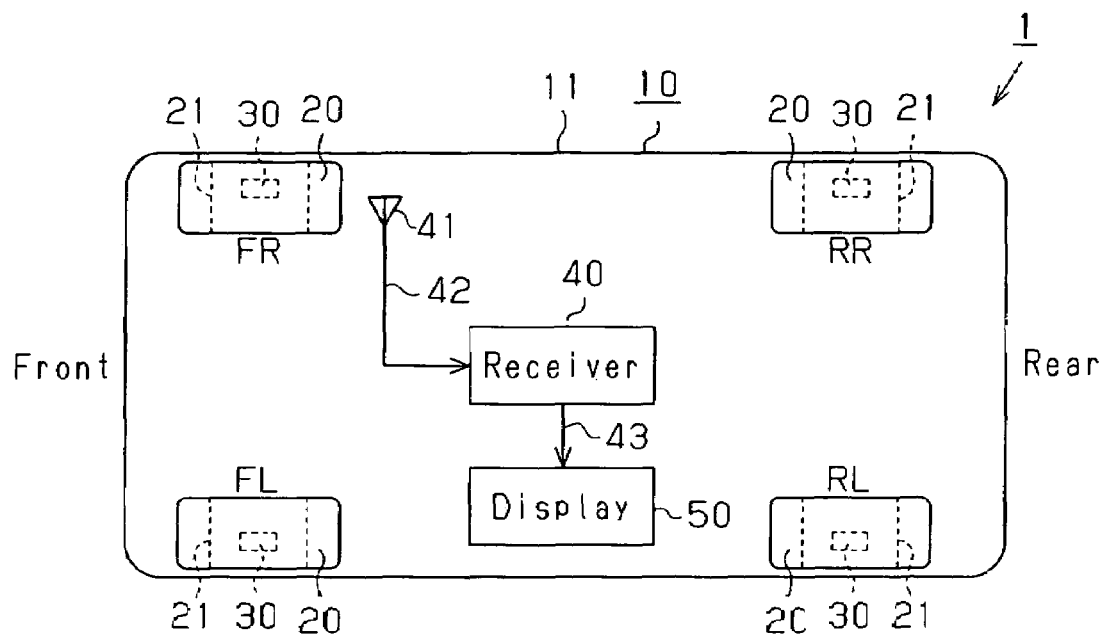
FIG. 1 is a diagrammatic view showing a tire condition monitoring apparatus according to one embodiment of the present invention.

As shown in FIG. 1, the tire condition monitoring apparatus 1 includes four transmitters 30 and a receiver 40. The each transmitter 30 is located in one of the tires 20 of the vehicle 10. The transmitters 30 are located in the front left tire 20 (FL), the front right tire 20 (FR), the rear left tire 20 (RL), and the rear right tire 20 (RR), respectively. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure of the tire 20. The transmitter 30 then wirelessly transmits a signal containing air pressure data.

The receiver 40 is located at a predetermined position on the body frame 11 and is activated by electricity of a battery (not shown) of the vehicle 10. The receiver 40 is connected to a reception antenna 41 with a cable 42. The receiver 40 receives the signal wirelessly transmitted by the transmitters 30 through the reception antenna 41.

A display 50 is located in the view of the driver of the vehicle 10, for example, in the passenger compartment. The display 50 is connected to the receiver 40 with a cable 43.

Figure 2:
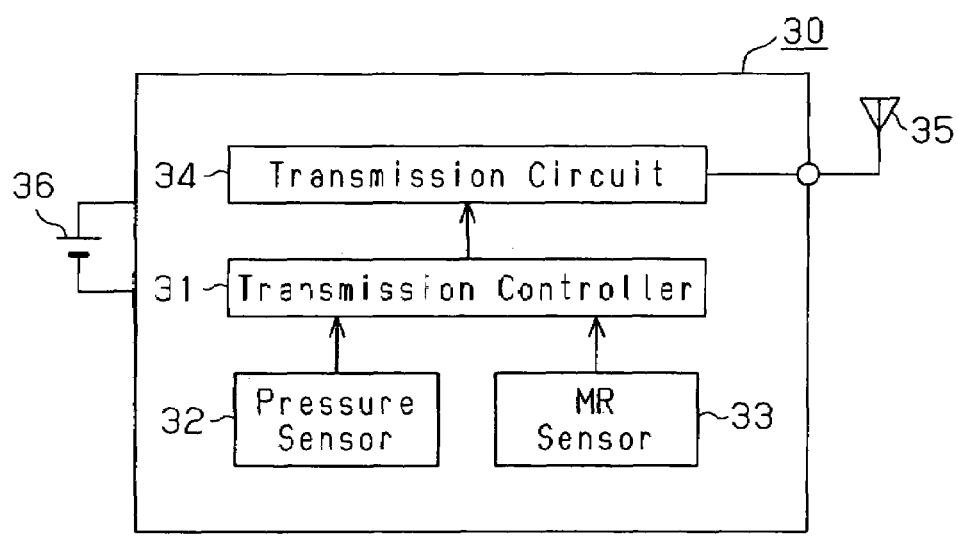
FIG. 2 is a block diagram showing one of the transmitters shown in FIG. 1.

As shown in FIG. 2, each transmitter 30 includes a transmission controller 31, which is a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transmitter 30 from the other three transmitters 30.

The tire pressure sensor 32 measures the air pressure in the interior of the associated tire 20 and provides the controller 31 with pressure data, which is obtained from the measurement. Each transmitter 30 is provided with a magnetic resistance (MR) sensor 33. The resistance value of each MR sensor 33 changes according to changes in the intensity of a magnetic field. The MR sensor 33 outputs a magnetization detection signal based on the magnetic resistance to the transmission controller 31.

Each transmission controller 31 sends data containing the air pressure data and the registered ID code to a transmission circuit 34. The transmission controller 31 identifies one of the tires 20 to which the corresponding transmitter 30 is attached on the basis of the input magnetization detection signal. That is, the transmission controller 31 determines the position at which the tire 20 having the transmitter 30 is mounted on the basis of the magnetization detection signal. The transmission controller 31 transmits information on the mounted position of the tire 20 to the transmission circuit 34. The transmission circuit 34 encodes and modulates the data sent from the transmission controller 31 to generate a transmission signal. The transmission circuit 35 then wirelessly sends the transmission signal through the antenna 35. Each transmitter 30 is provided with a battery 36. The transmitter 30 is driven by electricity of the battery 36.

Figure 3:
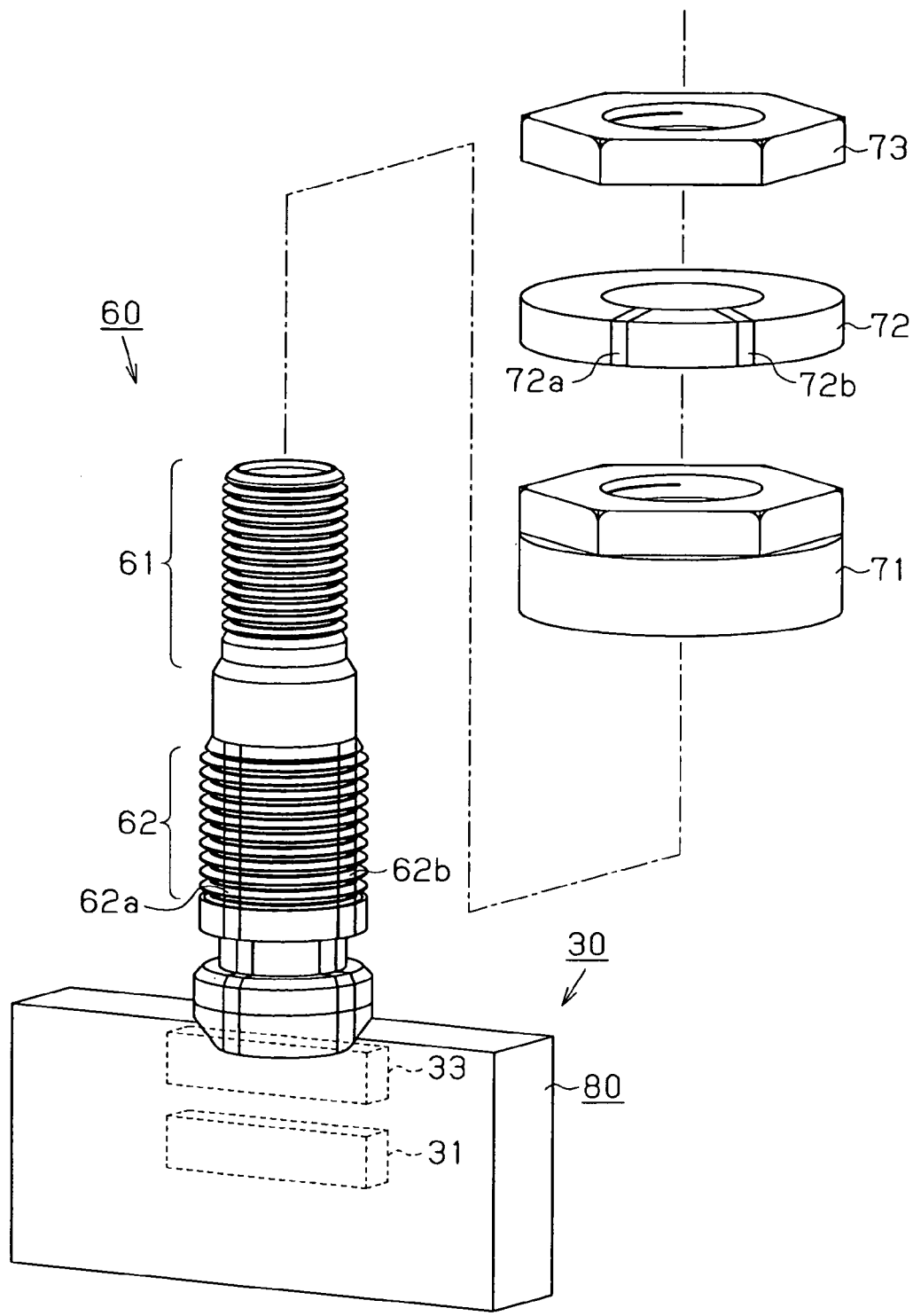
FIG. 3 is a diagrammatic view showing the structure of one of the transmitters shown in FIG. 1.

As shown in FIG. 3, a valve stem 60 has a threaded cap receiving portion 61 and a threaded fixing portion 62. The fixing portion 62 is threaded with a valve nut 71. A pair of pieces 62a and 62b of magnetic material are formed on the threaded fixing portion 62 through plating. The magnetic pieces 62a, 62b are formed, for example, with iron having a high relative permeability μs (μs=120 to 15000). The plated magnetic pieces 62a and 62b are separated from each other by an angle of ninety degrees in the circumferential direction of the threaded fixing portion 62.

The valve nut 71 is screwed on the threaded fixing portion 62 to fix the valve stem 60 to the wheel 21 of the tire 20. A pair of permanent magnets 72a and 72b are provided in a magnetic ring 72. The permanent magnets 72a and 72b are separated from each other by an angle of ninety degrees in the circumferential direction of the magnetic ring 72. The magnetic ring 72 is detachably fitted to the threaded fixing portion 62. The magnetic ring 72 is rotatable about the axis of the threaded fixing portion 62. When the positions of the permanent magnets 72a and 72b in the circumferential direction correspond to the magnetic pieces 62a and 62b on the threaded fixing portion 62, the magnetic pieces 62a and 62b are magnetized by the permanent magnets 72a and 72b. When the positions of the permanent magnets 72a and 72b in the circumferential direction are away from the magnetic pieces 62a and 62b on the threaded fixing portion 62, the magnetic pieces 62a and 62b are not magnetized by the permanent magnets 72a and 72b. The magnetic pieces 62a and 62b are magnetized or not magnetized depending on the distance between the magnetic pieces 62a and 62b and the permanent magnets 72a and 72b. A ring nut 73 is screwed on the threaded fixing portion 62 to fix the magnetic ring 72 in the circumferential direction. Each of the valve stem 60, the valve nut 71, the magnetic ring 72 and the ring nut 73 is formed of aluminum having a low relative permeability μs (μs=1.000214).

The transmitter 30 is accommodated in a casing 80 provided at the lower end of the valve stem 60. In the casing 80, the MR sensor 33 is placed immediately below the valve stem 60. That is, the MR sensor 33 is placed in the casing 80 so as to be closer to the lower ends of the magnetic pieces 62a and 62b, thereby detecting the magnetized states of the magnetic pieces 62a and 62b. The MR sensor 33 outputs the magnetization detection signal to the transmission controller 31 according to the magnetic resistance of the magnetic pieces 62a and 62b. The transmission controller 31 receives four modes of magnetization detection signals.

Figure 4:
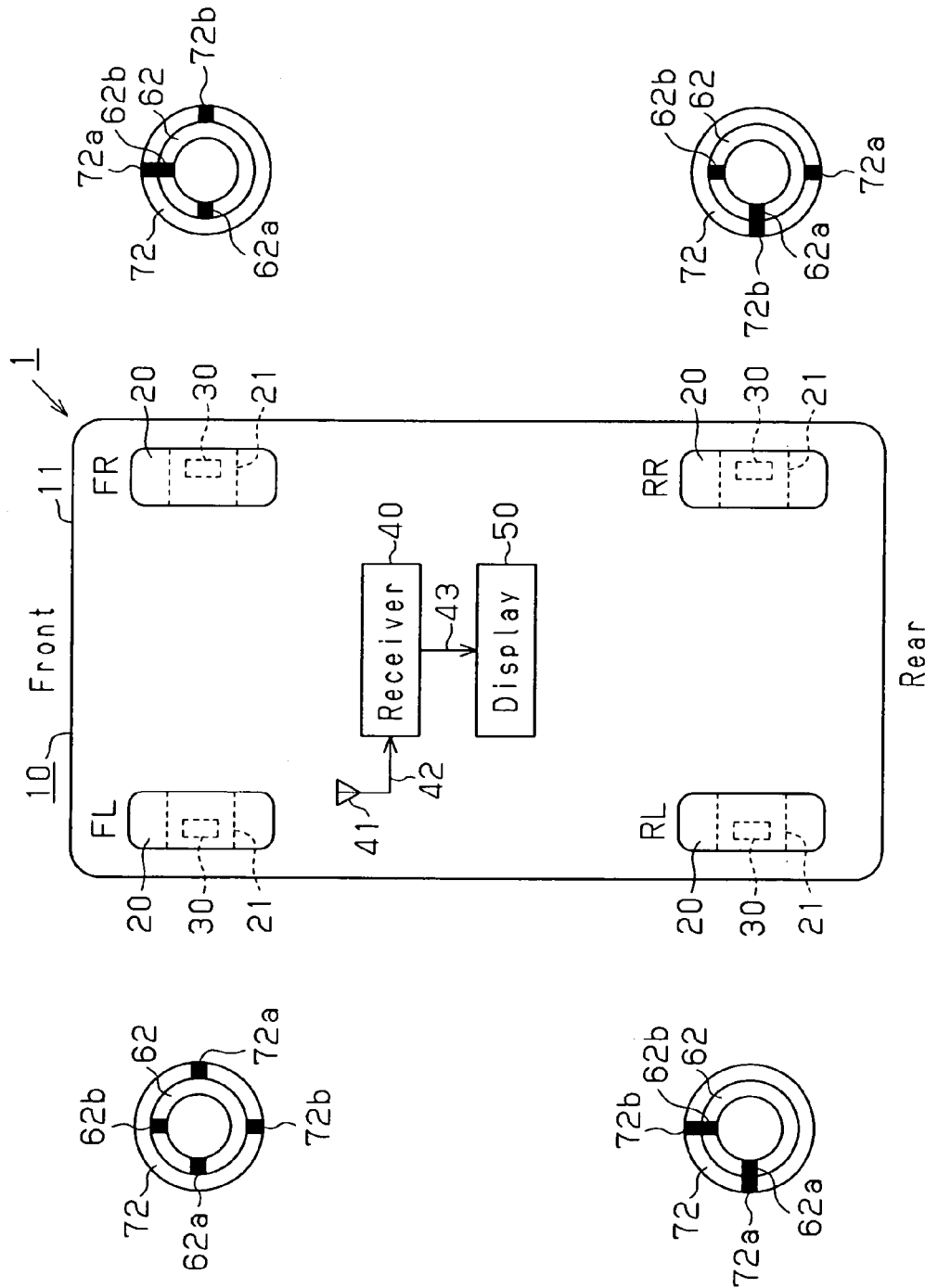
FIG. 4 is a diagram showing the relationship between a pair of pieces of a magnetic material and a pair of permanent magnets in each tire.

More specifically, it is assumed here that the relationship between the magnetic pieces 62a and 62b and the permanent magnets 72a and 72b is determined in advance as shown in FIG. 4.

Each of the magnetic pieces 62a and 62b on the threaded fixing portion 62 in the tire 20 of the front left wheel (FL) is not close to any of the permanent magnets 72a and 72b in the magnetic ring 72. Accordingly, each of the magnetic pieces 62a and 62b on the threaded fixing portion 62 is not magnetized. Consequently, the MR sensor 33 outputs to the transmission controller 31 the magnetization detection signal indicating that each of the magnetic pieces 62a and 62b is not magnetized.

The magnetic piece 62a on the threaded fixing portion 62 in the front right (FR) tire 20 is not close to any of the permanent magnets 72a and 72b in the magnetic ring 72. On the other hand, the magnetic piece 62b on the threaded fixing portion 62 is close to the permanent magnet 72a in the magnetic ring 72. Accordingly, the magnetic piece 62a on the threaded fixing portion 62 is not magnetized but the magnetic piece 62b on the threaded fixing portion 62 is magnetized. Consequently, the MR sensor 33 outputs to the transmission controller 31 the magnetization detection signal indicating that the magnetic piece 62a is not magnetized but the magnetic piece 62b is magnetized.

Each of the magnetic pieces 62a and 62b on the threaded fixing portion 62 in the rear left (RL) tire 20 are close to the permanent magnets 72a and 72b in the magnetic ring 72. Accordingly, each of the magnetic pieces 62a and 62b on the threaded fixing portion 62 is magnetized. Consequently, the MR sensor 33 outputs to the transmission controller 31 the magnetization detection signal indicating that each of the magnetic pieces 62a and 62b is magnetized.

The magnetic piece 62a on the threaded fixing portion 62 in the rear right (RR) tire 20 is close to the permanent magnet 72b in the magnetic ring 72. On the other hand, the magnetic piece 62b on the threaded fixing portion 62 is not close to any of the permanent magnets 72a and 72b in the magnetic ring 72. Accordingly, the magnetic piece 62a on the threaded fixing portion 62 is magnetized but the magnetic piece 62b on the threaded fixing portion 62 is not magnetized. Consequently, the MR sensor 33 outputs to the transmission controller 31 the magnetization detection signal indicating that the magnetic piece 62a is magnetized but the magnetic piece 62b is not magnetized.

Therefore, if information on the four modes of the magnetization detection signal is registered on an internal memory, e.g., a read-only memory (ROM) in the transmission controller 31 of the transmitter 30, the transmission controller 31 can determine to which one of the four tires 20 the transmitter 30 is attached. That is, the transmitter 30 can determine the position of the tire 20 in which the transmitter 30 is installed. Consequently, the transmitter 30 can identify the mounted position of the tire 20.

If the magnetic pieces 62a and 62b are magnetized during a long time period, residual magnetism exists in the magnetic pieces 62a and 62b even after moving the permanent magnets 72a and 72b away from the magnetic pieces 62a and 62b. The intensity of residual magnetism in the magnetic pieces 62a and 62b, however, is lower than that when the magnetic pieces 62a and 62b are magnetized, as is apparent from the hysteresis phenomenon. Thus, a threshold value selected by considering the residual magnetism in the magnetic pieces 62a and 62b is set in the transmission controller 31. More specifically, since the MR sensor 33 outputs the magnetization detection signal to the transmission controller 31 on the basis of the magnetic resistance of the magnetic pieces 62a and 62b, the transmission controller 31 compares the threshold value selected by considering the residual magnetism of the magnetic pieces 62a and 62b and the magnetization detection signal. On the basis of this comparison, the transmission controller 31 determines whether or not each of the magnetic pieces 62a and 62b is magnetized, i.e., whether or not each of the magnetic pieces 62a and 62b is close to the permanent magnet 72a or 72b. Therefore, even in a case where the magnetic pieces 62a and 62b are magnetized during a long time period, it is possible for the transmission controller 31 to reliably determine whether or not each of the magnetic pieces 62a and 62b is magnetized.

Figure 5:
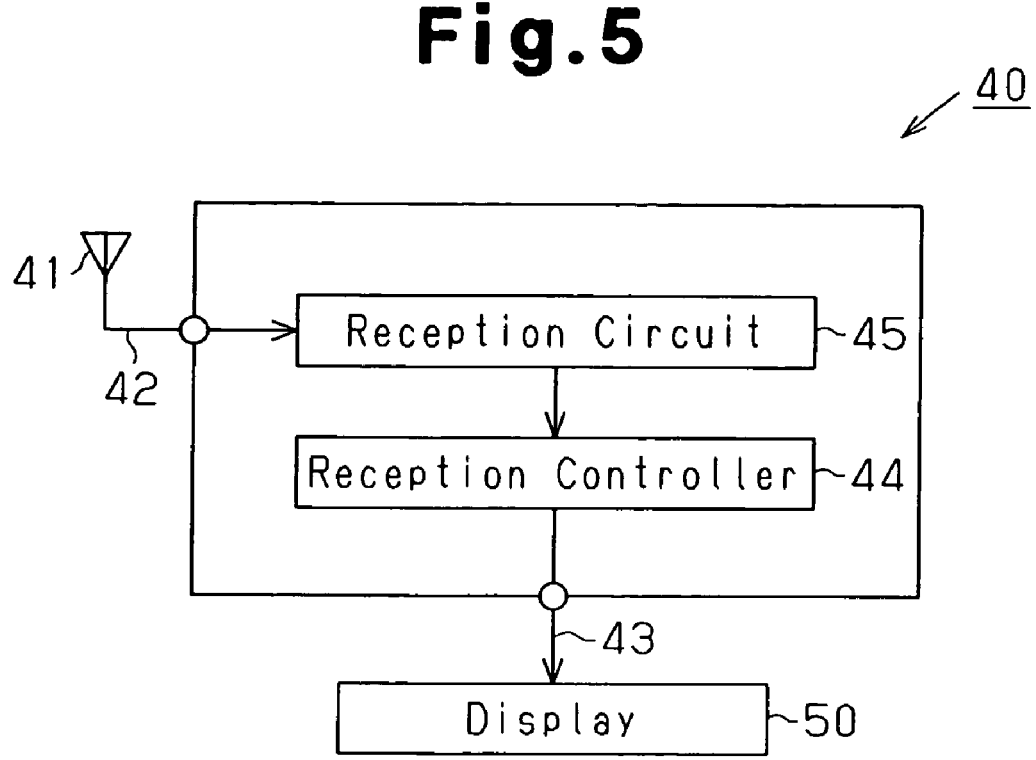
FIG. 5 is a block diagram showing a receiver.

As shown in FIG. 5, the receiver 40 includes a reception controller 44 and a reception circuit 45. The reception controller 44 processes signals received with the reception antenna 41. The reception controller 44, which is, for example, a microcomputer, includes a CPU, a ROM, and a RAM. The reception circuit 45 receives signals wirelessly transmitted by the transmitters 30 through the reception antenna 41. The reception circuit 45 demodulates and decodes the received signals to obtain data, and sends the data to the reception controller 44.

Based on the data from the reception circuit 45, the reception controller 44 obtains the internal pressure of the tire 20 that is associated with the transmitter 30 that is the source of the received data. The reception controller 44 also causes the display 50 to show data relating to the air pressure. Particularly, when there is an abnormality in the pressure of the tire 20, the controller 44 accordingly displays a warning on the display 50.

Further, the reception controller 44 stores a unique ID code contained in the received data in its internal memory, e.g., the RAM if a predetermined condition is satisfied. The internal memory has four memory areas each corresponding to the position of one of the four tires 20. Based on tire position information contained in the received data, reception controller 44 determines the position of the tire 20 that is associated with the transmitter 30 that is the source of the received data. Also, when the predetermined condition is satisfied, the reception controller 44 stores the ID code contained in the received data in the memory area that corresponds to the determined tire position. The predetermined condition is, for example, that the ID code contained in the received data does not match the ID code registered in the memory area that corresponds to the tire position determined based on the received data, and data containing the identical ID code has been received for a predetermined number of times. The predetermined condition is satisfied when, after the position of the tire 20 is changed in relation to the vehicle 10, the transmitter 30 performs transmission over the predetermined number of times.

As described above, in the receiver 40, the ID codes are registered in the internal memory of the reception controller 44 while being related to the mounted positions of the tires 20. Thus, unique ID codes representing the transmission-source transmitters 30 are registered in the internal memory of the reception controller 44. Each ID code is associated with the position of the tire 20 in which the corresponding transmitter 30 is provided. Determination as to coincidence between the ID codes, in other words, whether or not any change has been made in the mounted positions of the tires 20 on the vehicle 10 is executed, for example, during a predetermined time period (e.g., ten minutes) after startup of the receiver 40 with turning-on of a key switch (not shown) of the vehicle 10.

This embodiment has the following advantages.

(1) The threaded fixing portion 62 is plated with the pair of pieces 62a and 62b of magnetic material separated from each other by an angle of ninety degrees in the circumferential direction. The pair of permanent magnets 72a and 72b are provided in the magnetic ring 72 while being separated from each other by an angle of ninety degrees in the circumferential direction. The magnetic ring 72 is fitted around the threaded fixing portion 62. Therefore, the magnetic pieces 62a and 62b are magnetized or not magnetized depending on the remote/close relationship between the magnetic pieces 62a and 62b and the permanent magnets 72a and 72b. On the other hand, the MR sensor 33 constituting the transmitter 30 is placed immediately below the valve stem 60 in the casing 80. That is, the MR sensor 33 is placed in the casing 80 so as to be closer to the lower ends of the magnetic pieces 62a and 62b. The MR sensor 33 outputs the magnetization detection signal to the transmission controller 31 on the basis of the magnetic resistance of the magnetic pieces 62a and 62b. The transmission controller 31 can determine to which tire 20 the transmitter 30 is attached on the basis of the magnetization detection signal. That is, the transmitter 30 can determine its mounted position. Consequently, the transmitter 30 can identify the mounted position of the tire 20.

(2) Each transmitter 30 wirelessly transmits to the receiver 40 data including air pressure data, the ID code registered in its internal memory, and information indicating the mounted position of the tire 20. The receiver 40 registers the ID code in the internal memory of the reception controller 44 by relating the mounted position of the tire 20 and the ID code to each other on the basis of the information indicating the mounted position of the tire 20. Thus, the receiver 40 can identify the mounted position of the tire 20 and there is no need for performing an operation for initial registration of the ID code.

(3) When the key switch (not shown) of the vehicle 10 is turned on, the receiver 40 is activated. Determination is then made during passage of a predetermined time period as to coincidence between the ID codes. This is because the key switch is ordinarily turned off when a new tire 20 is mounted on the vehicle 10 or when a change is made in the mounted positions of the tires 20 on the vehicle 10. In other words, timing of determination as to coincidence between the ID codes, i.e., whether or not any of the tires 20 has been changed, is selected such that the determination is made only in a particular situation, e.g., a situation where a change is made in the mounted positions of the tires 20. Therefore, ID codes can be efficiently registered in the internal memory, e.g., the RAM of the reception controller 44. In other words, each time data wirelessly transmitted from the transmission-source transmitter 30 is received, it is not necessary to again register in the internal memory of the reception controller 44 the ID code contained in the received data. Therefore, it is also possible to reduce the load on the reception controller 44.

(4) Each of the valve stem 60, the valve nut 71, the magnetic ring 72 and the ring nut 73 is formed of aluminum. The relative permeability μs (μs=1.00214) of aluminum is significantly small in comparison with the relative permeability μs (μs=120 to 15000) of iron. Each of the valve stem 60, the valve nut 71, the magnetic ring 72 and the ring nut 73 is not substantially magnetized by the pair of permanent magnets 72a and 72b. Consequently, the pair of magnetic pieces 62a and 62b can be efficiently magnetized by the pair of permanent magnets 72a and 72b.

It should be apparent to those skilled in the art that the present invention may be embodied in many other specific forms without departing from the spirit or scope of the invention. Particularly, it should be understood that the invention may be embodied in the following forms.

The embodiment has been described with respect to the arrangement in which the ring nut 73 is screwed on the threaded fixing portion 62 of the valve stem 60 to keep the magnetic ring 72 on the threaded fixing portion 62 at all times. However, the magnetic ring 72 may be provided only when necessary by screwing the ring nut 73 on the threaded fixing portion 62 of the valve stem 60. For example, the magnetic ring 72 is necessary when a new tire 20 is mounted on the vehicle 10 or when a change is made in the mounted positions of the tires 20 on the vehicle 10. The arrangement may alternatively be such that the magnetic ring 72 and the ring nut 73 are provided on the threaded fixing portion 62 of the valve stem 60 only when necessary. In other words, if the magnetic ring 72 and the ring nut 73 are not always provided on the threaded fixing portion 62 of the valve stem 60, it is possible to limit the intensity of residual magnetism remaining on the magnetic pieces 62a and 62b. Therefore, there is no need to set in the transmission controller 31 the threshold value selected by considering the residual magnetism. Moreover, since only the valve nut 71 is provided on the threaded fixing portion 62 of the valve stem 60 as in the conventional arrangement, balancing of the tire 20 when the tire 20 is mounted on the wheel 21 can be easily performed. Further, the unsprung weight of the vehicle 10 can be reduced, although the amount of reduction is small.

Continuous recesses and projections may be formed in the upper end surface of the valve nut 71 shown in FIG. 3, and also continuous recesses and projections may be formed in the opposed lower end surface of the magnetic ring 72. In this case, the remote/close relationship between the pair of magnetic pieces 62a and 62b and the pair of permanent magnets 72a and 72b is reliably maintained. Such an arrangement prevents magnetic ring 72 from rotating by following the rotation of the ring nut 73 when the ring nut 73 is screwed on the threaded fixing portion 62. Thus, the remote/close relationship between the pair of magnetic pieces 62a and 62b and the pair of permanent magnets 72a and 72b is reliably maintained.

In the above-described embodiment, the vehicle 10 have four tires 20. Accordingly, the mounted positions of the tires 20 on the vehicle a10 are identified by means of the combination of the pair of magnetic pieces 62a and 62b and the pair of permanent magnets 72a and 72b. Needless to say, the number of magnetic pieces 62a (62b) and the number of permanent magnets 72a (72b) may be changed as desired according to the number of tires 20 mounted on the vehicle 10. By selecting the numbers of these components, the above-described embodiment can be applied to multi-wheeled buses, trailers, etc.

A magnetic impedance sensor, a Hall sensor, flux gate sensor or a coil may be used in place of the MR sensor 33. That is, any device capable of detecting a change in magnetic resistance of the magnetic pieces 62a and 62b or a change in magnetism at these magnetic pieces, i.e., whether or not the magnetic pieces 62a and 62b are magnetized, may be used.

While the receiver 40 having one antenna 41 with respect to the four transmitter 30 has been described, the arrangement of the receiver 40 may alternatively be such that four reception antennas 41 are provided in correspondence with the four transmitters 30. Also, one reception antenna 41 may be provided in each of front and rear portions of the vehicle 10, that is, two reception antennas may be provided.

The above-described embodiment may be applied to other types of valve, e.g., a snap-in type of valve.

In addition to the pressure sensor 32, each transmitter 30 may have another measuring means such as a temperature sensor for measuring the temperature in the tire 20. In this case, the transmitter 30 wirelessly also transmits the temperature data in the tire 20.

Air pressure data transmitted by the transmitter 30 may indicate the value of the air pressure or whether the air pressure is within a permissible range.

Gas filling the tires 20 need not be air, which contains 78% of nitrogen. For example, nitrogen gas (100% of nitrogen) may be used.

Other than four-wheeled vehicles, the present invention may be applied to two-wheeled vehicles, such as bicycles and motorcycles, multi-wheeled busses, multi-wheeled towed vehicles, and industrial vehicles, such as forklifts. When the present invention is applied to a trailer, the receiver 40 and the display 50 are provided in the tractor.

The present examples and embodiments are to be considered as illustrative and not restrictive and the invention is not to be limited to the details given herein, but may be modified within the scope and equivalence of the appended claims.

The invention claimed is:

1. A transmitter in an apparatus for monitoring a condition of a tire of a vehicle, wherein the transmitter is provided in the tire, the transmitter comprising:
    a measuring device for measuring a condition of the tire;
    a transmission circuit, wherein the transmission circuit generates a transmission signal containing data that represents the measured tire condition;
    a valve stem, wherein the tire is filled with air through the valve stem, and wherein the valve stem has a magnetic piece;
    a magnetizing member for magnetizing the magnetic piece, wherein the position of the magnetizing member relative to the magnetic piece can be changed, and wherein a magnetized state of the magnetic piece varies according to the position of the magnetizing member relative to the magnetic piece; and
    a magnetized state detecting device for detecting the magnetized state of the magnetic piece, wherein the transmission signal contains data based on the detected magnetized state in addition to the tire condition data.

2. The transmitter according to claim 1, wherein the tire is one of a plurality of tires of the vehicle, wherein the transmitter is one of a plurality of transmitters each of which is provided in one of the tires, wherein each transmitter includes a controller, and wherein, based on the magnetized state detected by the corresponding magnetized state detecting device, each controller determines the position of the tire in which the associated transmitter is provided.

3. The transmitter according to claim 2, wherein the transmission signal of each transmitter contains data representing the position of the corresponding tire.

4. The transmitter according to claim 1, wherein the magnetic piece is one a plurality of magnetic pieces that are arranged at predetermined intervals along a circumferential direction of the valve stem.

5. The transmitter according to claim 4, wherein the magnetic pieces include a first magnetic piece and a second magnetic piece, and wherein the position of the magnetizing member can be changed relative to the first magnetic piece and the second magnetic piece such that one of the following magnetized states is selected, the magnetized states including: a state where the first and second magnetic pieces are both magnetized; a state where only the first magnetic piece is magnetized; a state where only the second magnetic piece is magnetized; and a state where the first and second magnetic pieces are not magnetized.

6. The transmitter according to claim 1, wherein the magnetizing member is detachably attached to the valve stem.

7. The transmitter according to claim 1, wherein the magnetizing member is a magnetic ring, the magnetic ring being attached to the valve stem such that the magnetic ring can be rotated about an axis of the valve stem, and wherein the magnetic ring includes at least one permanent magnet located at a section of a circumferential direction of the magnetic ring.

8. The transmitter according to claim 7, wherein the valve stem includes a threaded portion on an outer circumferential surface, where a nut is threaded to the threaded portion, and wherein the nut fixes a circumferential position of the magnetic ring relative to the valve stem.

9. An apparatus for monitoring conditions of a plurality of tires of a vehicle, the apparatus comprising:
a plurality of transmitters each provided in one of the tires, wherein each transmitter includes:
a measuring device for measuring a condition of the corresponding tire;
a transmission circuit, wherein the transmission circuit generates a transmission signal containing data that represents the measured tire condition;
a valve stem, wherein the tire is filled with air through the valve stem, and wherein the valve stem has a magnetic piece;
a magnetizing member for magnetizing the magnetic piece, wherein the position of the magnetizing member relative to the magnetic piece can be changed, and wherein a magnetized state of the magnetic piece varies according to the position of the magnetizing member relative to the magnetic piece; and
a magnetized state detecting device for detecting the magnetized state of the magnetic piece, wherein the transmission signal contains data based on the detected magnetized state in addition to the tire condition data, and
a receiver for receiving the transmission signals that are wirelessly transmitted by the transmitters, wherein, when receiving the transmission signal from any one of the transmitters, the receiver determines the position of the tire in which the transmitter that has transmitted the signal is provided based on the received transmission signal.

10. The apparatus according to claim 9, wherein the magnetic piece is one a plurality of magnetic pieces that are arranged at predetermined intervals along an circumferential direction of the valve stem.

11. The apparatus according to claim 10, wherein the magnetic pieces include a first magnetic piece and a second magnetic piece, and wherein the position of the magnetizing member can be changed relative to the first magnetic piece and the second magnetic piece such that one of the following magnetized states is selected, the magnetized states including: a state where the first and second magnetic pieces are both magnetized; a state where only the first magnetic piece is magnetized; a state where only the second magnetic piece is magnetized; and a state where the first and second magnetic pieces are not magnetized.

12. The apparatus according to claim 9, wherein the magnetizing member is detachably attached to the valve stem.

13. The apparatus according to claim 9, wherein the magnetizing member is a magnetic ring, the magnetic ring being attached to the valve stem such that the magnetic ring can be rotated about an axis of the valve stem, and wherein the magnetic ring includes at least one permanent magnet located at a section of a circumferential direction of the magnetic ring.

14. The apparatus according to claim 13, wherein the valve stem includes a threaded portion on an outer circumferential surface, where a nut is threaded to the threaded portion, and wherein the nut fixes a circumferential position of the magnetic ring relative to the valve stem.

* * * * *